(12) United States Patent
Ibenthal et al.

(10) Patent No.: US 11,492,055 B2
(45) Date of Patent: Nov. 8, 2022

(54) PARKING ROBOT FOR A TRANSPORTATION VEHICLE

(71) Applicant: VOLKSWAGEN AKTIENGESELLSCHAFT, Wolfsburg (DE)

(72) Inventors: Julius Ibenthal, Lehrte (DE); Theodoros Tzivanopoulos, Wolfsburg (DE)

(73) Assignee: Volkswagen Aktiengesellschaft

( * ) Notice: Subject to any disclaimer, the term of this patent is extended or adjusted under 35 U.S.C. 154(b) by 427 days.

(21) Appl. No.: 16/693,661

(22) Filed: Nov. 25, 2019

(65) Prior Publication Data
US 2020/0180712 A1 Jun. 11, 2020

(30) Foreign Application Priority Data
Dec. 6, 2018 (DE) ...................... 10 2018 221 173.6

(51) Int. Cl.
| | |
|---|---|
| *B60P 3/06* | (2006.01) |
| *B62D 39/00* | (2006.01) |
| *B60G 17/00* | (2006.01) |
| *B60K 1/00* | (2006.01) |
| *B60K 17/04* | (2006.01) |
| *B62D 63/02* | (2006.01) |
| *E04H 6/42* | (2006.01) |

(52) U.S. Cl.
CPC ............. *B62D 39/00* (2013.01); *B60G 17/00* (2013.01); *B60K 1/00* (2013.01); *B60K 17/04* (2013.01); *B62D 63/02* (2013.01); *E04H 6/424* (2013.01)

(58) Field of Classification Search
CPC ......... E04H 6/422; E04H 6/424; E04H 6/426; B62D 39/00; B62D 63/02; B60G 17/00; B60K 1/00; B60K 17/04
See application file for complete search history.

(56) References Cited

U.S. PATENT DOCUMENTS 5,110,067 A * 5/1992 Sinkkonen ................ B64F 1/22
244/50
5,286,156 A * 2/1994 Ikenouchi ............... E04H 6/183
414/256

(Continued)

FOREIGN PATENT DOCUMENTS

| AT | 503472 A1 | 10/2007 |
|---|---|---|
| CN | 206600034 U | 10/2017 |

(Continued)

*Primary Examiner* — Toan C To
(74) *Attorney, Agent, or Firm* — Barnes & Thornburg, LLP (57) ABSTRACT

A parking robot for a transportation vehicle having a holding device for firmly holding a wheel of the transportation vehicle and housing at least one drive installation on two opposite sides. The drive installation has a height-adjustable running gear having at least one parking robot wheel and adjusts the holding device relative to the at least one parking robot wheel between a lowered and a raised position. The parking robot autonomously moves to a receiving position on the wheel of the transportation vehicle, in which receiving position the holding device firmly holds the wheel, and by adjusting the holding device to the raised position by the running gear, raises the firmly held wheel of the transportation vehicle relative to the respective parking robot wheels.

20 Claims, 3 Drawing Sheets

(56) References Cited

U.S. PATENT DOCUMENTS

| | | | |
|---|---|---|---|
| 5,863,171 A * | 1/1999 | Engman | E04H 6/183 414/241 |
| 5,893,571 A * | 4/1999 | Nowell | B60B 29/002 280/413 |
| 6,378,644 B1 | 4/2002 | Brown et al. | |
| 7,736,113 B2 * | 6/2010 | Yook | E04H 6/183 414/256 |
| 7,740,438 B2 * | 6/2010 | Xiang | E04H 6/183 414/256 |
| 8,016,303 B1 * | 9/2011 | Ullman | B62B 5/0083 414/426 |
| 8,613,582 B2 * | 12/2013 | Shani | E04H 6/245 414/241 |
| 9,120,412 B2 * | 9/2015 | Cantor | B62D 55/02 |
| 9,389,614 B2 * | 7/2016 | Shani | E04H 6/24 |
| 9,527,394 B1 * | 12/2016 | Tang | B60W 10/26 |
| 9,919,906 B2 * | 3/2018 | March | B66F 9/075 |
| 10,612,260 B2 * | 4/2020 | Cheng | E04H 6/22 |
| 2004/0124029 A1 | 7/2004 | Takenaka et al. | |
| 2004/0146384 A1 * | 7/2004 | Whelan | B60S 13/00 414/426 |
| 2008/0031711 A1 * | 2/2008 | Yook | E04H 6/305 414/253 |
| 2009/0250890 A1 * | 10/2009 | Ceccarelli, III | B60P 3/127 280/79.4 |
| 2010/0034626 A1 * | 2/2010 | Reiniger | E04H 6/183 414/253 |
| 2014/0140793 A1 * | 5/2014 | Shani | E04H 6/22 414/800 |
| 2017/0089087 A1 * | 3/2017 | Valli | E04H 6/183 |
| 2018/0142488 A1 * | 5/2018 | Boussard | E04H 6/182 |
| 2020/0180572 A1 * | 6/2020 | Tzivanopoulos | B62D 15/0285 |
| 2020/0180695 A1 * | 6/2020 | Tzivanopoulos | B62D 15/021 |
| 2021/0347290 A1 * | 11/2021 | Fu | E04H 6/36 |

FOREIGN PATENT DOCUMENTS

| | | |
|---|---|---|
| CN | 206987493 U | 2/2018 |
| CN | 207761382 U | 8/2018 |
| CN | 108661388 A | 10/2018 |
| CN | 108678468 A | 10/2018 |
| DE | 102011109597 A1 | 2/2013 |
| DE | 102011109598 A1 | 2/2013 |
| DE | 102015203506 A1 | 9/2016 |
| DE | 102016224098 A1 | 6/2018 |
| DE | 102017217821 A1 | 4/2019 |
| EP | 0735215 A1 | 10/1996 |

* cited by examiner

PARKING ROBOT FOR A TRANSPORTATION VEHICLE

PRIORITY CLAIM

This patent application claims priority to German Patent Application No. 10 2018 221 173.6, filed 6 Dec. 2018, the disclosure of which is incorporated herein by reference in its entirety.

SUMMARY

Illustrative embodiments relate to a parking robot for a transportation vehicle.

BRIEF DESCRIPTION OF THE DRAWINGS

An exemplary embodiment described hereunder. To this end, in the figures.

DETAILED DESCRIPTION

A parking robot is usually conceived for transporting a transportation vehicle within a predefined infrastructural environment, for example, a covered car park, to a predefined parking position. To this end, the parking robot, for example, by way of at least a sub-region, moves below the transportation vehicle, raises the latter, and thereafter, conjointly with the raised transportation vehicle, moves to the predefined parking position where the parking robot sets down the transportation vehicle again. A transportation vehicle, independently of whether or not the transportation vehicle has, for example, a driver assistance system for at least partially autonomous parking, by a parking robot can thus be moved in a fully autonomous manner and thus without any input of a driver of the transportation vehicle within the infrastructural environment.

An omnidirectional mobile transportation vehicle transport platform which has at least three Mecanum wheels is described in DE 10 2016 224 098 A1. By way of this mobile transportation vehicle transport platform, it is possible to move into the intermediate space between a transportation vehicle floor pan of a transportation vehicle and a carriageway, and for the transportation vehicle thereafter to be raised from the carriageway by a lifting device of the transportation vehicle transport platform. The transportation vehicle is hereby raised from the carriageway at least axle-by-axle or completely.

A transport carriage for a transportation vehicle which on two opposite sides has respective clamping parts and is conceived for being positioned below the transportation vehicle and by way of the respective clamping parts for raising a respective wheel of a wheel axle of the transportation vehicle is described in CN 207761382 U.

Disclosed embodiments provide a solution by way of which a parking robot which is conceived for transporting a transportation vehicle can raise the transportation vehicle.

The disclosure is based on the concept that conventional single-part or multiple-part parking robots which raise the respective wheels in each case in the region of a wheel axle of the transportation vehicle or in the region of individual wheels of the transportation vehicle must have only a minor construction height. The reason therefor lies in that the parking robot usually has a holding device for firmly holding at least one wheel of the transportation vehicle, the holding device intended to hold the at least one wheel in a lower sub-region of the respective wheel of the transportation vehicle. A running gear of a parking robot therefore should have an ideally small height in a parking robot vertical direction. In the case of parking robots configured in such a low manner, Mecanum wheels are however often resorted to, which enable omnidirectional driving maneuvers without having to be equipped with mechanical steering. However, Mecanum wheels have the drawback that the Mecanum wheels have a lot of slippage when driving and that steps cannot be negotiated since the Mecanum wheels would slide off the steps. It is therefore beneficial to resort to simple wheels or rollers for the parking robot be moved, and to implement an omnidirectional lifting running gear for the parking robot by way of a corresponding drive installation.

The disclosed parking robot for a transportation vehicle first comprises a holding device for firmly holding a wheel of the transportation vehicle. The holding device can be configured, for example, so as to be U-shaped having respective radiused or sharp corners, wherein a spacing between two respective opposite wheel holding arms of the holding device can be provided in such a manner that a typical wheel of a transportation vehicle fits between the two wheel holding arms. At least one drive installation is in each case at least indirectly disposed on two opposite sides of the holding device, for example, on the two opposite wheel holding arms. The drive installation can be disposed, for example, on respective outwardly directed sides of the respective wheel holding arms of the holding device. The parking robot may have a total of four drive installations, specifically two drive installations that are in each case disposed beside one another on in each case one of the two opposite sides of the holding device.

Each of the at least two drive installations comprises a height-adjustable running gear having at least one parking robot wheel as well as at least one drive machine for driving the at least one parking robot wheel. The parking robot wheel herein is configured as a wheel that is capable of being driven, or as a roller that is capable of being driven, wherein the height-adjustable running gear of the respective drive installation may comprise two parking robot wheels which are in each case disposed on mutually opposite positions within the drive installation. Moreover, each of the two parking robot wheels of the respective running gear may have a dedicated drive machine, for example, a dedicated electric drive machine. The at least one electric drive machine of the drive installation is supplied with electric power by a battery that is centrally disposed in the parking robot, for example.

The running gear is now conceived for adjusting the holding device relative to the at least one parking robot wheel between a lowered position and a raised position. The running gear of the parking robot, that is to say the components of the parking robot which serve for connecting a chassis of the parking robot to a driving floor by way of the respective parking robot wheels, are thus conceived for moving the chassis of the parking robot up and down, the chassis here being comprised by the holding device. A ground clearance of the parking robot, that is to say a spacing between a lower side of the holding device and the driving floor, can thus be decreased or increased, respectively, on account of the adjustment between the lowered and the raised position.

The parking robot is now conceived for autonomously moving the wheel of the transportation vehicle to a receiving position. The parking robot in the receiving position firmly holds the wheel by the holding device, that is to say that the parking robot positions itself in front of the wheel of the transportation vehicle in such a manner that one of the wheel holding arms of the holding device in a transportation vehicle longitudinal direction is positioned in front of the wheel of the transportation vehicle, and the other wheel holding arm of the holding device in the transportation vehicle longitudinal direction is positioned behind the wheel. The parking robot, by adjusting the holding device to the raised position by the respective height-adjustable running gears of the at least two drive installations, is moreover conceived for raising the firmly held wheel of the transportation vehicle relative to the respective parking robot wheels. As soon as the parking robot has thus moved to the receiving position on the wheel, the parking robot by the height-adjustable running gear starts to raise the holding device relative to the respective parking robot wheels and thus relative to the driving floor, wherein the wheel of the transportation vehicle held by the holding device is continuously moved upward in the transportation vehicle vertical direction. In the case of the holding device in the receiving position not yet having fixed the wheel, for example, between the two opposite wheel holding arms of the holding device, contact between the holding device and the wheel is achieved only while raising the holding device, for example, at a raised intermediate position, and the wheel is actually raised from the driving floor only thereafter, while being raised between the intermediate position and the raised position.

The parking robot may have a total of four drive installations, two on each of the two opposite sides of the holding devices, the four drive installations comprising in each case two parking robot wheels having, for example, two dedicated drive machines. The parking robot overall thus may have eight parking robot wheels which are capable of being driven. By the height-adjustable running gear it is now possible for the parking robot be able to lift one wheel of a transportation vehicle from the driving floor. A lifting running gear for transporting, for example, transportation vehicles is thus implemented for the parking robot by the height-adjustable running gear. Relatively simple wheels or rollers that are capable of being driven can be resorted to herein, such that no complex Mecanum wheels have to be installed in the parking robot for the latter be designed in a space-saving manner.

To be able to raise a transportation vehicle having, for example, four wheels, so as to be able to transport the transportation vehicle through a covered car park and set it down again at a target position, for example, four parking robots which by the respective height-adjustable running gear of the respective drive installations that can in each case move up and down one of the wheels of the transportation vehicle are required. On account of the individual parking robots being disposed on individual wheels of the transportation vehicle, the overall system of parking robots does not have any large plate construction that is disposed below the transportation vehicle such that ramps and inclines can be negotiated with parking robots of this type, for example, when travelling from one level of a covered car park to another level of the covered car park, without parts of one of the parking robots landing on the firm ground.

Disclosed design embodiments on account of which additional benefits are derived are also part of the disclosure.

In at least one disclosed design embodiment it is provided that the respective drive installation has in each case one central threaded bar. The central threaded bar at one end is at least indirectly coupled rigidly to the holding device. For example, when the parking robot has a total of four drive installations, a total of four threaded bars are fixedly disposed either directly or by way of an intermediate element on a lower side of the holding device, for example, on respective holding elements of the holding device. The running gear of the respective drive installation now has in each case one threaded nut that is mounted so as to be rotatable about the respective central threaded bar. The rotatably mounted respective threaded bar is at least indirectly coupled to the at least one parking robot wheel of the respective running gear. The threaded bar and the threaded nut have in each case profiled notches which in a helical manner, that is to say as helical lines, run in a respective cylindrical wall in such a manner that the threaded bar and the threaded nut fit into one another. In the case of a relative movement of the threaded nut in relation to the threaded bar, a relative movement of the respective running gear in relation to the holding device thus takes place.

The respective drive installation of the parking robot by correspondingly rotating the threaded nut about the respective central threaded bar, by way of the respective central threaded bars, which are disposed on the holding device, is conceived for adjusting the holding device relative to the respective threaded nut between the lowered and the raised position. Since the threaded nut is comprised by the respective running gear and is not connected to the holding device, the raising and the lowering of the holding device is possible relative to the parking robot wheels and thus to the driving floor on which the parking robot stands. By rotating the respective threaded nut about the respective central threaded bar a linear movement of the parking robot in the parking robot vertical direction is possible so as to ultimately raise the wheel of the transportation vehicle from the driving floor and to simultaneously increase the ground clearance of the parking robot. On account of the increase of the parking robot ground clearance it is moreover possible that travel on driving floors with floor unevennesses such as, for example, potholes, is enabled.

In at least one disclosed design embodiment it is provided that the respective drive installation, by driving the at least one parking robot wheel on a circular path about the central threaded bar, is conceived for rotating the threaded nut about the central threaded bar. A functional mode of the height-adjustable running gear thus is based on the at least one parking robot wheel which by way of a bearing axle is coupled to the central threaded bar, for example, being actuated in a driven manner such that the parking robot wheel performs a circular movement, that is to say travels on the circular path about the threaded bar by way of a predefined radius which is a function of the length of the respective bearing axle. A rotation axis of the rotating movement, that is to say of the circular path, herein runs parallel with the parking robot vertical direction through a center of the central threaded bar. Since the central threaded bar is fixedly disposed on the holding device, it can be enabled on account of the rotation of the threaded nut about the central threaded bar, this being performed by the circular movement of the at least one parking robot wheel, that the holding device is height-adjusted relative to the respective parking robot wheels. By way of the lifting device of the parking robot described it is thus possible for an individual wheel of the transportation vehicle to be able to be raised.

In one refinement of the parking robot it is provided that the respective drive installation comprises a collector ring, and the at least one drive machine while driving the at least one parking robot wheel on the circular path is conceived for being likewise moved about the central threaded bar and by the collector ring being provided with electric power. The drive installation of a parking robot wheel is disposed, for example, beside the threaded nut so as to be parallel with the bearing axle of the parking robot wheel, and thus relatively close to the running gear. By virtue of this arrangement, the drive machine likewise rotates about the central threaded bar when the at least one parking robot wheel is moved about the threaded bar. The parking robot wheel as well as the drive machine will thus rotate about the same rotation axis at least when adjusting between the lowered and the raised position, the rotation axis having the center thereof in a center of the circular central threaded bar. Radii of respective circular paths herein can be of identical size, or the radius of the circular path of the drive machine can be chosen so as to be larger than the radius of the circular path of the at least one parking robot wheel, for example. On account thereof it becomes possible that the collector ring for transmitting an electrical output, for example, from a battery of the parking robot, and/or for transmitting signals, for example, from a control installation of the parking robot, is disposed in such a manner that an electrical connection, for example, to the battery and/or the control installation, is established by a sliding contact, for example. A respective fully functional drive installation of the parking robot for driving the respective at least one parking robot wheel is implemented.

At least one further disclosed design embodiment provides that the respective drive installation has two parking robot wheels which at opposite positions are connected to the threaded nut by respective bearing axles, for example, wherein respective extensions of the respective bearing axles are congruent. The respective drive installation for adjusting the holding position between the lowered and the raised position is now conceived for driving the two parking robot wheels in each case in the opposite rotation direction of the parking robot wheels. On account of driving the parking robot wheels in such a manner it is specifically possible for the parking robot wheels to be moved on the circular path about the central threaded bar and on account thereof to move the threaded nut relative to the central threaded bar and on account thereof to adjust the running gear in terms of height. Moreover, the respective drive installation by the parking robot wheels is conceived for enabling a translatory movement of the parking robot, that is to say for carrying out a movement of the parking robot on the driving floor to the front, the rear, the right, and the left, and thus in all directions in the plane which is defined by the parking robot transverse direction and the parking robot longitudinal direction. To this end, the drive installation is conceived for driving the two parking robot wheels in the same rotation direction, that is to say that both parking robot wheels at a specific point in time are both rotated either in the clockwise manner or in a counter-clockwise manner, for example. With the aid of differentials in the respective rotating speeds of the respective drive machine for the respective parking robot wheels it is moreover possible for an orientation of the parking robot for the transitory movement to be set.

By way of the parking robot it is thus possible, firstly, that an upward or downward movement of the threaded nut relative to the threaded bar arises in a rotation of the respective two parking robot wheels about the respective central threaded bar. The thread herein has a minor pitch such that small steering angles, that is to say minor movements along the circular path, have only a minor lifting effect and there is therefore a high gearing ratio present when raising. However, in the presence of a mutual relative movement of the two parking robot wheels, the parking robot wheels rotate relative to the floor. In this way, driving maneuvers can thus be carried out on the driving floor. The parking robot thus does not require a separate running gear for vertical and translatory, that is to say horizontal, movements. A compact construction mode of the parking robot is possible on account thereof, since the parking robot has only to comprise the described running gear per drive installation so as to be in each case mobile relative to the driving floor in the parking robot vertical direction as well as in the parking robot transverse direction and the parking robot longitudinal direction.

In at least one further disclosed design embodiment it is provided that the respective at least one parking robot wheel by way of a respective bearing axle is at least indirectly coupled elastically to the respective threaded nut, wherein the respective bearing axle is coupled to a respective absorption unit of the drive installation. It can be provided herein for example, that a frame structure which by way of respective springs such as, for example, plate springs, is connected to an absorption frame, which in turn is at least indirectly disposed on the lower side of the holding device, is disposed on the respective bearing axle. For example, when the parking robot now is imparted shocks in the vertical direction, for example, by virtue of floor unevennesses of the driving floor, the respective shock can be intercepted by the described absorption unit and the vibration associated therewith can be at least reduced.

Additionally or alternatively thereto, it is possible for a connection axle to be disposed between the respective drive installation and the threaded nut and to be coupled to the absorption frame such that horizontal shocks are also absorbed and an intensity of the vibrations resulting from the shocks can be reduced. This is possible since the bearing axle, or the connection axle between the drive machine and the threaded nut, respectively, is in each case mounted so as to be elastic and thus movable within predefined limits of movement. The running characteristics of the parking robot are improved on account thereof, and a height differential on the driving floor, which results, for example, on account of height differentials between respective contact areas of the individual parking robot wheels, is equalized. Stress by shock on individual components of the parking robot is thus reduced.

At least one disclosed embodiments provides that the respective threaded bar at the respective other end thereof is coupled to a respective detent element. The threaded bar at one end is thus at least indirectly coupled rigidly to the holding device, and at the other end is coupled to the detent element. The detent element is configured for blocking the rotation of the respective threaded nut the respective central threaded bar at the end of the respective threaded bar when the end is reached, thus when the detent element is reached. The threaded bar, or the plurality of threaded bars disposed in the parking robot, respectively, thus have in each case a lower detent point such that it is impossible for the holding device to be adjusted so far upward that there is no longer any contact between the threaded bar and the threaded nut since the threaded nut has been rotated completely off the central threaded bar. In the case of reversed rotating movement, the threaded nut can impact the lower side of the holding device and be blocked on account thereof. The height-adjustable running gear thus has in each case one maximum adjustment point in both adjustment directions, that is to say in the direction of the raised position as well as in the direction of the lowered position, any further rotating movement in the respective rotation direction no longer being possible at the maximum adjustment point. Releasing the threaded nut from the central threaded bar is thus precluded at all times.

In at least one further disclosed design embodiment it is provided that the respective at least one parking robot wheel has a respective drive shaft which by way of a respective belt drive is coupled to a respective output shaft of the respective drive machine. The respective drive installations thus have respective belt transmissions which have in each case a respective belt as the relevant load transmission means. A traction means transmission which is often used in the construction of machines is thus used as the transmission. The belt drive can be, for example, a belt drive based on mutually engaging V-ribs.

Alternatively thereto, the drive of the respective parking robot wheels can comprise a multi-stage transmission. The reason therefor lies in that a high drive torque and a low rotating speed are required when travelling ramps, but a lower drive torque and a higher rotating speed are required when travelling on a flat section. However, the respective drive machine in both cases should operate at an optimal working point, that is to say at the so-called operating point. This can be achieved, for example, by way of a dual-stage transmission which has in each case fixed gear ratios between the drive machine and the drive wheel for travelling on inclines as well as for travelling on a flat surface.

Alternatively or additionally thereto, a continuously variable belt transmission can also be utilized for transmitting an output. This is because a high gear ratio between the drive machine and the drive wheel is typically set when starting up as well as when travelling ramps. However, the gear ratio is lowered again in the case of a low load moment on a flat section. In this way, the handling of heavy loads, for example, of heavy transportation vehicles, can be improved. The continuously variable belt transmission can thus dynamically adapt to the load of the parking robot and consequently have another gear ratio when starting up than when travelling at high speeds. A continuously variable transmission of this type is often also referred to as a variomatic transmission.

However, the use of a multi-stage transmission or of a continuously variable belt transmission is more complex and more cost-intensive than the use of the belt transmission described. The latter is therefore provided as a space-saving and cost-effective transmission for transmitting the motor output of the respective drive machine to the parking robot wheel in the parking robot. Moreover, the two movement directions described above, specifically the translatory travelling movement as well as the linear up and down movement of the holding device relative to the parking robot wheels, are possible by the belt transmission.

In at least one disclosed embodiment it is provided that the parking robot is conceived for moving below the transportation vehicle and therebelow to autonomously position itself in the receiving position on the wheel of the transportation vehicle. A surface of the holding device of the parking robot is therefore designed so as to be flat, that is to say not to have any elevations or depressions. On account thereof, it is possible for the parking robot be able to move into an intermediate space between a transportation vehicle floor pan and the driving floor. For the transportation vehicle to be raised, optionally four parking robots first move below the transportation vehicle, holding on there in each case to one of the four wheels of the transportation vehicle, and then positioning themselves in such a manner that respective wheel holding arms of the respective holding devices of the four parking robots encompass in each case the respective shell faces of the respective wheels from at least two sides. It is thus not necessary for the parking robot to move close to the wheel of the transportation vehicle from the outside. On account thereof, with the aid of parking robots of this type transportation vehicles can be parked as tightly beside one another at respective target positions as is permitted by the laterally projecting side mirrors of the respective transportation vehicles, since no space is required for the parking robot travelling beside the transportation vehicle. The described parking robot is thus space-optimized in terms of a region required around the transportation vehicle for the parking robot be positioned, the wheel to be raised, the transportation vehicle to be transported, and the wheel to be lowered.

In at least one further disclosed design embodiment it is provided that the holding device on the two opposite sides has in each case one wheel holding arm for firmly holding the wheel of the transportation vehicle, as well as a connection element. The respective wheel holding arms are disposed together with the connection element in such a manner that the connection element holds the two wheel holding arms in a parallel position. The holding device, when viewed from above, thus has a U-shaped design, wherein the respective wheel holding arms are mutually parallel. The respective at least two drive installations herein may be disposed on external sides of the respective wheel holding arms, specifically on respective outwardly directed external sides. The respective drive installations are thus optionally not disposed in the direction of an internal space of the U-shaped holding devices on the respective wheel holding arms.

The respective wheel holding arms now have respective slip rollers, the respective rotation axis thereof being disposed so as to be parallel with a longitudinal direction of the respective wheel holding arm. The slip rollers are configured as passive rollers. The slip rollers are thus at all times movable relative to the wheel holding arm, for example, as well as relative to the wheel of the transportation vehicle. On account thereof, it is possible for the parking robot to be able to be moved relative to the wheel of the transportation vehicle that is firmly held by the respective wheel holding arm. On account thereof, it becomes possible that, for example, ramps, inclines, or other unevennesses can be negotiated by the parking robot since a relative movement of the wheel in relation to the parking robot is possible.

It is moreover possible that respective sensor installations are disposed in the region of the wheel holding arms, for example, the sensor installations detecting a spacing between the wheel holding arm and the wheel of the transportation vehicle in the receiving position, whereupon by laterally disposed spindle motors the holding arms can first be moved to the wheel of the transportation vehicle until the holding arms firmly hold the wheel between the two respective wheel holding arms, for example. However, it is also possible for the holding device to be configured without spindle motors and sensors of this type, and optionally for the respective wheel holding arms to come into contact with the wheel only when adjusting the holding device relative to the respective parking robot wheels, and thus for the actual raising of the wheel to be performed only from a predefined height adjustment, the intermediate position, of the height-adjustable running gear. In the case of transportation vehicles having small transportation vehicle ground clearances it is relevant that the holding device by way of the respective wheel holding arms is dynamically adaptable to a transportation vehicle ground clearance as well as to a diameter of the wheels of the transportation vehicle. However, the holding device in a parking robot vertical direction should at all times be configured so as to be as small as possible to be able to also be moved below a transportation vehicle having a small transportation vehicle ground clearance.

The parking robot can comprise, for example, a sensor installation, for example, a camera, a radar apparatus, a Lidar apparatus, an ultrasonic sensor, or a laser scanner, and by way of those being conceived for detecting an environment of the parking robot as well as for identifying and localizing obstacles in the detected environment. With the aid of a sensor installation of this type, which provides the data thereof to the control installation of the parking robot, for example, it is possible for the control installation of the parking robot to determine, for example, a travel trajectory for the parking robot such that the parking robot can autonomously travel through an infrastructural environment such as, for example, a covered car park. It is moreover possible herein for a plurality of parking robots to maintain respective lines of communication between one another by way of which the travel trajectory and/or data pertaining to the travel trajectory are/is exchanged. Moreover, the parking robot is conceived for receiving actuation commands and/or the travel trajectory from, for example, a pilot robot, an infrastructural administration server such as the covered car park administration server, or other parking robots.

According to the disclosure, a method for operating a parking robot as has been described above is moreover provided. The design embodiments presented in the context of the disclosed parking robot, and the benefits of the disclosed design embodiments apply in an analogous manner to the disclosed method for operating the parking robot. The method comprises the following, for example: autonomously moving the parking robot beside a wheel of the transportation vehicle to a receiving position in which the holding device firmly holds the wheel, and raising the firmly held wheel of the transportation vehicle relative to the respective parking robot wheels by adjusting a holding device of the parking robot to a raised position by at least two height-adjustable running gears.

The control installation for the parking robot is also part of the disclosure. The control installation has a processor installation which is specified for carrying out an exemplary embodiment of the disclosed method. To this end, the processor installation can have at least one microprocessor and/or at least one microcontroller. The processor installation can furthermore have a program code which when executed by the processor installation is specified for carrying out the exemplary embodiment of the disclosed method. The program code can be stored in a data memory of the processor installation.

The disclosure also comprises the combinations of the features of the embodiments described.

In the case of the exemplary embodiment, the components of the embodiment described represent in each case individual features of the disclosure which are to be considered independently and which refine the disclosure in each case also in a mutually independent manner and are therefore also to be considered individually or in any combination other than the combination shown to be a component part of the disclosure. Furthermore, the embodiment described can also be enhanced by further features of the features of the disclosure already described.

Functionally equivalent elements in the figures are in each case provided with the same reference signs.

Figure 1:
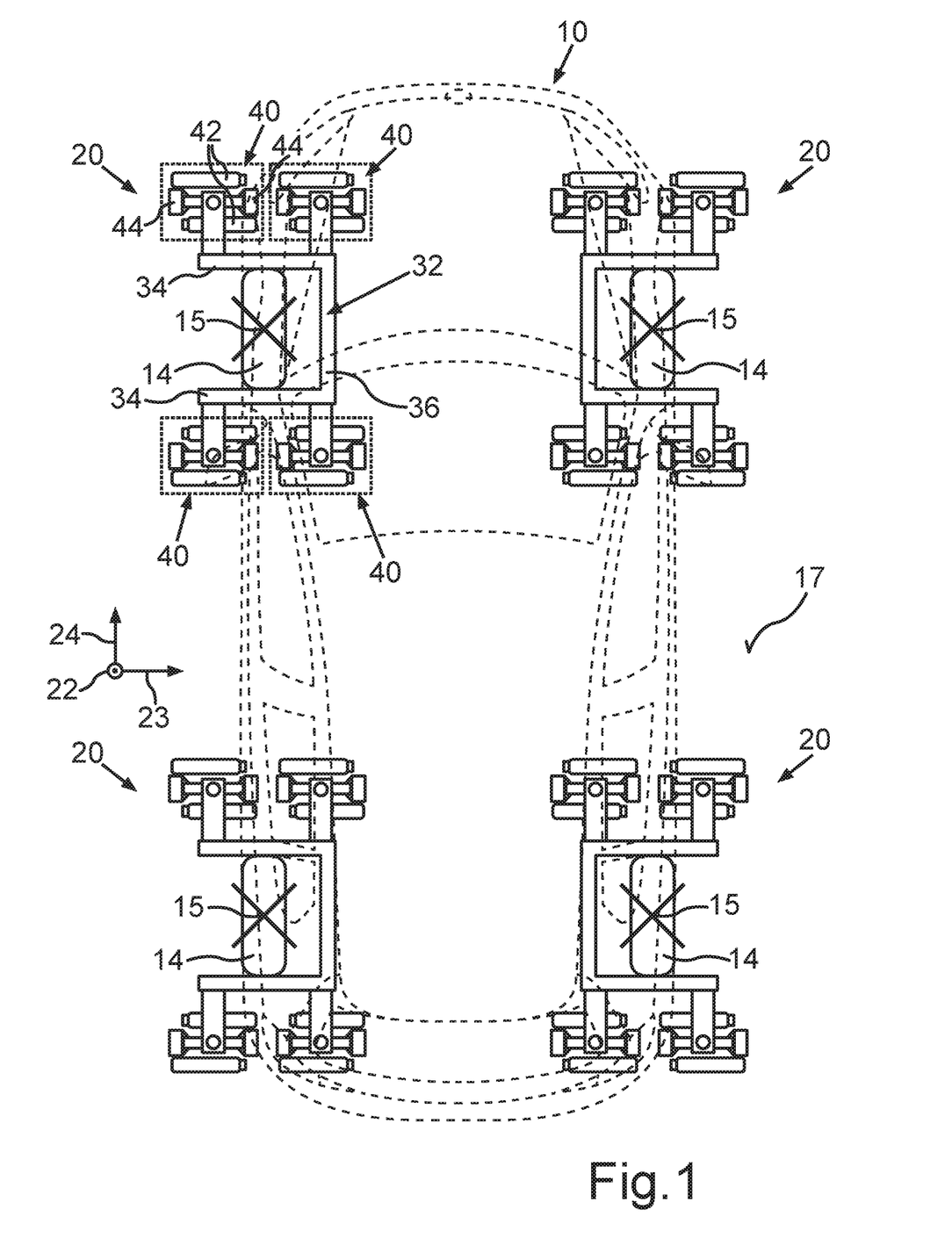
FIG. 1 shows a plan view of a transportation vehicle which is raised by four parking robots.

A transportation vehicle 10, which has four wheels 14 which at respective wheel contact areas 15, schematically illustrated here by way of a respective cross, stand on a driving floor 17, is schematically illustrated in a plan view in FIG. 1. In each case one parking robot 20 is positioned at each of the four wheels 14 of the transportation vehicle 10. The individual components of the parking robot 20 herein are schematically illustrated only for the parking robot 20 at top left, but are identical for all parking robots 20 illustrated.

The parking robot 20 has a holding device 32 which on two opposite sides has in each case one wheel holding arm 34 for firmly holding the wheel 14 of the transportation vehicle 10, as well as one connection element 36. The connection element 36 holds the two wheel holding arms 34 in a parallel position.

Two drive installations 40 are in each case disposed on the two wheel holding arms 34. The in total four drive installations 40 of the parking robot 20 have in each case one height-adjustable running gear 50 (see reference sign 50 in FIG. 2). The height-adjustable running gear 50 comprises two parking robot wheels 44 such that the parking robot 20 has a total of eight parking robot wheels 44. The parking robot wheels 44 are in each case capable of being driven by an electric drive machine 42. The respective drive installations 40 herein are coupled to the holding device 32 by way of respective holding elements 33. Moreover, a parking robot vertical direction 22, a parking robot transverse direction 23 as well as a parking robot longitudinal direction 24 are plotted with the aid of a coordinate system in FIG. 1.

The parking robots 20 are in each case configured so as to be relatively flat; this means that the surface of the respective parking robot 20 is designed so as to be flat such that the parking robot 20 can in each case move into an intermediate space between a transportation vehicle floor pan and the driving floor 17. The parking robots 20 are in each case conceived for moving below the transportation vehicle 10 and therein being in each case autonomously positioned at a receiving position on one wheel 14 of the transportation vehicle 10, as is schematically illustrated in FIG. 1. In the receiving position one wheel 14 of the transportation vehicle 10 is in each case firmly held by the holding device 32 of a respective parking robot 20.

Figure 2:
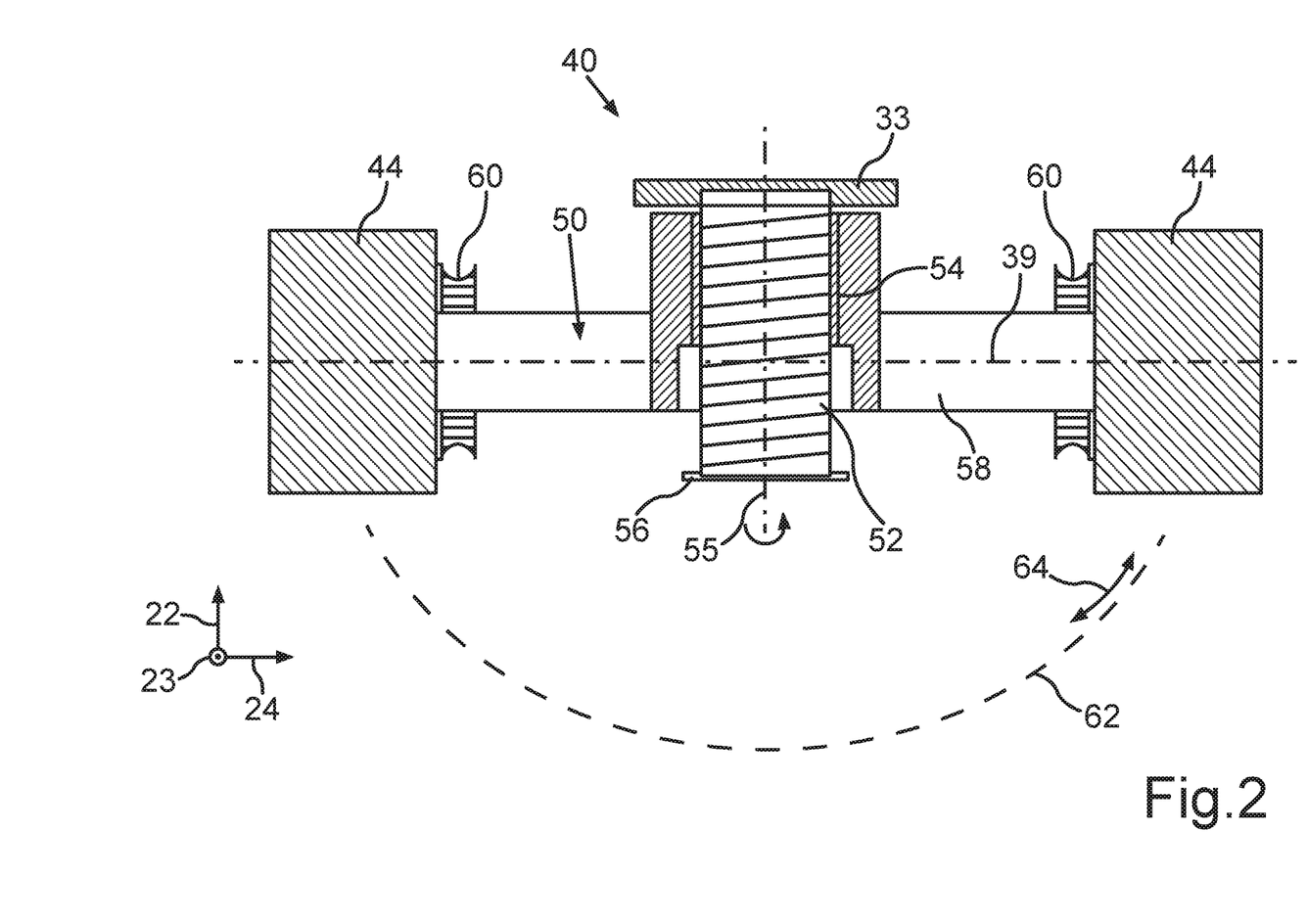
FIG. 2 shows a sectional illustration of a drive installation of a parking robot.

A sectional illustration of a drive installation 40 of the parking robot 20 is schematically illustrated in FIG. 2. The running gear 50 of the drive installation 40 is specifically conceived for adjusting the holding device 32 relative to the respective parking robot wheels 44 in the parking robot vertical direction 22 between a lowered position and a raised position, the holding device 32 by way of the holding element 33 being at least indirectly coupled to the drive installation 40. To this end, the drive installation 40 has a central threaded bar 52 which at one end is at least indirectly coupled rigidly to the holding device 32, specifically by way of the holding element 33. The threaded bar 52 at the other end thereof moreover has a detent element 56.

The running gear 50 of the drive installation 40 has a threaded nut 54 which is mounted so as to be rotatable about the central threaded bar 52 and which by a bearing axle 58 is coupled to the two parking robot wheels 44. The drive installation 40 by correspondingly rotating the threaded nut 54 about the central threaded bar 52 is now conceived for adjusting the holding device 32, on which the central threaded bar 52 is disposed, relative to the threaded nut 54 between the lowered and the raised position. This is performed in that the two parking robot wheels 44 are driven on a circular path 62 about the central threaded bar 52, on account of which the threaded nut 54 is rotated about the central threaded bar 52. The two parking robot wheels 44 in the indicated rotation direction 64 thus rotate about a rotation axis 55 which runs through a center of the threaded bar 52. Since either the holding element 33 or the detent element 56 is rigidly coupled to the respective end of the threaded bar 52, the rotation of the threaded nut 54 about the central threaded bar 52 is blocked at each of the two ends of the threaded bar 52. The parking robot wheels 44 herein rotate about the rotation axis 39 so as to move on the circular path 62 or any other movement direction. Respective sprockets 60 are provided for transmitting power from the drive machine 42 to the parking robot wheel 44.

Figure 3:
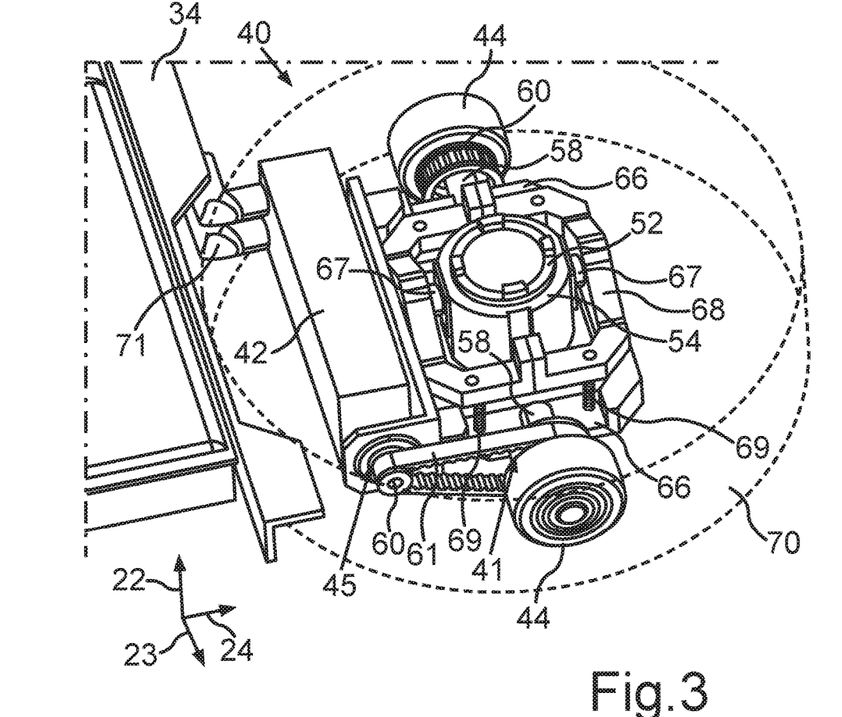
FIG. 3 shows a perspective view of a drive installation of a parking robot.

A perspective view of the drive installation 40 is schematically illustrated in detail in FIG. 3. The drive mechanism of the parking robot wheels 44 is highlighted herein. This is because each of the parking robot wheels 44 has a drive shaft 41 on which a sprocket 60 is disposed and which by way of a V-belt 61 is coupled to the sprocket 60 of an output shaft 45 of the respective electric drive machine 42. The sprockets 60 as well as the V-belt 61 herein have V-structures that fit into one another. The sprocket 60 for the parking robot wheel 44 which in the parking robot transverse direction 23 is illustrated at the rear is schematically illustrated without the V-belt 61 running thereon such that the V-structure is rendered particularly evident. A respective drive machine 42 for the rear parking robot wheel 44 could be disposed, for example, on the other side of the threaded bar 52 having the threaded nut 54 disposed thereabout, the other side being parallel with the schematically illustrated drive machine 42.

It is moreover highlighted in FIG. 3 how an absorption unit for the drive installation 40 can be implemented. The respective bearing axle 58 of the respective drive wheels 44 has a bearing axle frame 66. The bearing axle frame 66 is coupled to an absorption frame 68, specifically by way of respective plate springs 69. The absorption frame 68 in an upper sub-region is in turn coupled to the holding device 32 (not schematically illustrated here) as is the central threaded bar 52. Vertical vibrations such as can arise, for example, when travelling on an uneven driving floor 17, can be reduced and thus absorbed by way of an absorption unit of this type, for example. It is a precondition thereof however that the respective bearing axle 58 is in each case elastically coupled to the threaded nut 54. The drive installation 40 moreover has a drive axle 67 which connects the drive machine 42 to the threaded nut 54. Coupling to the absorption frame 68 by the plate spring 69 can also be performed in the region of the drive axle 67 such that horizontal shocks can also be absorbed.

The drive machine 42 while driving the parking robot wheel 44 on the circular path 62 about the central threaded bar 52 is conceived for likewise carrying out a rotating movement about the rotation axis 55. Therefore, a collector ring 70, by way of which the drive machine 42 can be supplied with electric power by the sliding contact 71, so as to be able to drive the drive wheel 44, is disposed about the circular path 62.

In a rotating movement of the parking robot wheels 44 about the rotation axis 55 a movement in the parking robot vertical direction 22 is ultimately possible since the holding device 32 herein can be adjusted between the lowered and the raised position. The two parking robot wheels 44 herein are in each case driven in opposite rotation directions 64 about the rotation axis 39. However, a translatory movement of the parking robot 20 is also possible by way of the parking robot 20 as well as by way of the drive installation 40, wherein the two parking robot wheels 44 in this instance are driven in such a manner that the two parking robot wheels 44 rotate in an identical rotation direction 64 about the respective rotation axes 39 of the respective parking robot wheels 44.

Figure 4:
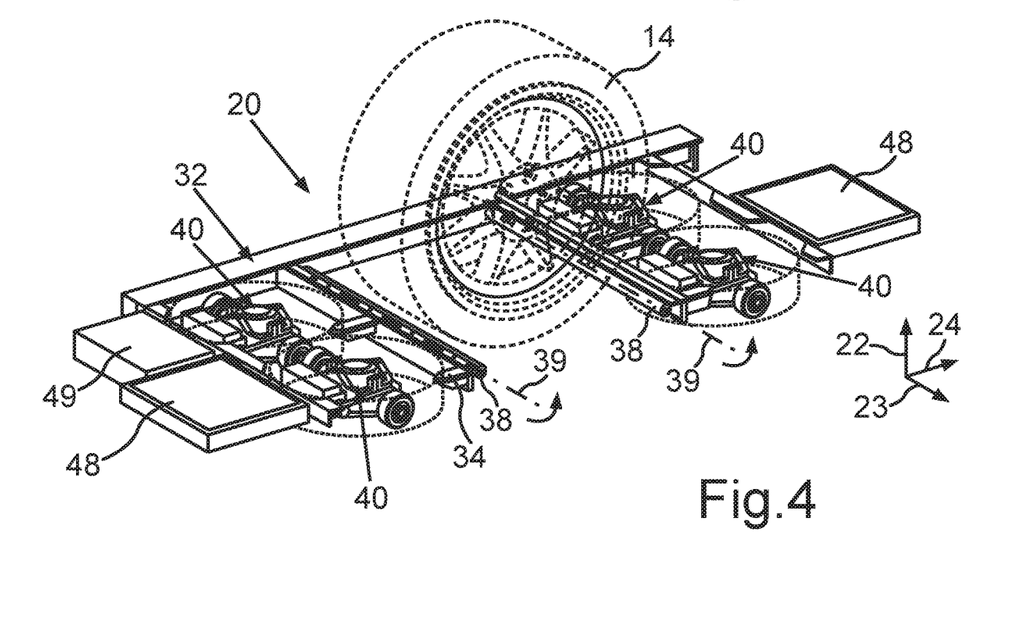
FIG. 4 shows a sectional illustration of a parking robot which is disposed on a wheel of a transportation vehicle.

The parking robot 20 which comprises a total of four drive installations 40 is schematically illustrated in a sectional illustration in which the holding device surface is not illustrated in FIG. 4. It becomes evident herein that respective slip rollers 38 are disposed on the respective wheel holding arms 34, the respective rotation axes 39 of the slip rollers 38 being disposed parallel with a longitudinal direction of the respective wheel holding arms 34. The slip rollers 38 are in each case configured as passive rollers such that the rollers can move relative to the wheel 14 of the transportation vehicle 10.

Moreover, the parking robot 20 on both sides has in each case one sensor installation 48, the sensor installation 48 being, for example, a camera, a radar apparatus, a Lidar apparatus, a laser scanner, or an ultrasound apparatus. The sensor installation 48 is in each case conceived for detecting an environment of the parking robot 20 and for optionally localizing obstacles in the detected environment. The parking robot 20 moreover has a control installation 49 which, for example, based on the sensor data of the sensor installations 48, is conceived for determining a travel trajectory for the parking robot 20, or for providing corresponding control commands for the positioning in the receiving position on the wheel 14 of the transportation vehicle 10. The parking robot 20 can moreover comprise a communications interface by way of which the parking robot 20 can receive the travel trajectory, sensor data, and/or actuation controls from other installations, for example, other parking robots 20, from a pilot robot, or from an infrastructural administration server, or transmit the items of data to the other installations.

The parking robot 20 overall, for example, in a covered car park, is conceived for autonomously raising a wheel 14 of a transportation vehicle 10, then conjointly with a plurality of parking robots 20 which have in each case raised one of the wheels 14 of the transportation vehicle 10 to travel to a target position in the covered car park, and there to set down the wheel 14 again. The raising of the wheel 14 herein is performed only by rotating the threaded nut 54 about the threaded bar 52 in the respective drive installations 40 of the parking robot 20, that is to say with the aid of the respective height-adjustable running gears 50, such that the holding device 32 having the firmly held wheel 14 can in each case be displaced to the raised position.

The example shows an overall system which is composed of four identical transport platforms, specifically the parking robot 20. For a transportation vehicle 10 be able to be transported by way of the parking robots 20, for example, the respective parking robots 20 travel to one of the wheels 14 of the transportation vehicle 10 such that a center of the respective wheel contact areas 15 is positioned centrically between two wheel holding arms 34. The holding device 32, that is to say the supporting structure of the parking robot 20, thus surrounds the wheel 14 of the transportation vehicle 10. Each transport platform, that is to say each parking robot 20, now possesses four drive installations 40 which can also be referred to as trucks. Each one of the drive installations 40 can rotate about the rotation axis 55 which is fixedly coupled to the holding device 32. The rotation axis 55 herein runs centrically through the respective threaded bar 52. The parking robot wheels 44 which by way of a belt drive are connected to the respective drive machine 42, that is to say a motor, are now fastened to the drive installation 40. The difference in terms of the rotating speed of the respective driving machine 42 can be set by way of the orientation of the drive installation 40. A lifting action which moves the holding device 32 upward and thus ultimately raises the transportation vehicle 10 is now generated by rotating the drive installation 40 multiple times about the threaded bar 52, that is to say about the rotation axis 55. The parking robot wheels 44 herein are mounted on respective bearing axles 58 and are connected to respective sprockets 60 which can also be referred to as pulleys. When a mutual relative movement of the respective parking robot wheels 44 and a drive installation 40 is present, the parking robot wheels 44 rotate relative to the floor. In this way, driving maneuvers in the plane that is defined by the parking robot longitudinal direction 24 and the parking robot transverse direction 23 can be freely chosen. When a rotation about the threaded bar 52 arises, the threaded nut 54 carries out an upward or downward movement. The thread even possesses a minor pitch so that small steering angles of the parking robot 20 have only a minor lifting effect and a high gearing ratio is present when raising the holding device 32.

The threaded bar 52 possesses a lower detent, the detent element 56, which at the upper end is statically connected to the supporting structure of the transport platform, that is to say the holding device 32 of the parking robot 20. For the running characteristics to be improved, the bearing axle 58 can be elastically connected to the threaded nut 54. A height differential in the hard ground between the spacing areas of the respective parking robot wheels 44 on the driving floor 17 can thus be equalized.

The example overall shows a multi-robot transportation vehicle having an underride function and an omnidirectional lifting running gear for transporting transportation vehicles 10.

LIST OF REFERENCE SIGNS

10 Transportation vehicle
14 Wheel
15 Wheel contact area
17 Driving floor
20 Parking robot
22 Parking robot vertical direction
23 Parking robot transverse direction
24 Parking robot longitudinal direction
32 Holding device
33 Holding element
34 Wheel holding arm
36 Connection element
38 Slip roller
39 Rotation axis
40 Drive installation
41 Drive shaft
42 Drive machine
44 Parking robot wheel
45 Output shaft
48 Sensor installation
49 Control installation
50 Running gear
52 Threaded bar
54 Threaded nut
55 Rotation axis
56 Detent element
58 Bearing axle
60 Sprocket
61 V-belt
62 Circular path
64 Rotation direction
66 Bearing axle frame
67 Drive axle
68 Absorption frame
69 Plate spring
70 Collector ring
71 Sliding contact.

The invention claimed is:

1. A parking robot for a transportation vehicle, wherein the parking robot comprises:
a holding device for firmly holding a wheel of the transportation vehicle;
at least one drive installation disposed at least indirectly on two opposite sides of the holding device, wherein the at least one drive installation has one height-adjustable running gear having at least one parking robot wheel and at least one drive machine for driving the at least one parking robot wheel,
wherein the running gear adjusts the holding device relative to the at least one parking robot wheel between a lowered position and a raised position, and the parking robot autonomously moves the wheel of the transportation vehicle to a receiving position in which the holding device firmly holds the wheel and adjusts the holding device to the raised position, and
wherein the running gear is configured to raise the firmly held wheel of the transportation vehicle relative to the respective parking robot wheels,
wherein each of the at least one drive installations includes a central threaded bar and threaded nut mounted rotatably about the respective central threaded bar, one of the central threaded bar and the threaded nut being at least indirectly coupled with the holding device and the other of the central threaded bar and the threaded nut being at least indirectly coupled with the at least one parking robot wheel, wherein the at least one drive installation adjusts the holding device between the lowered and raised positions by rotation of the threaded nut relative to the respective central threaded bar.

2. The parking robot of claim 1, wherein the central threaded bar is at least indirectly coupled rigidly to the holding device at one end, and the running gear of the respective drive installation includes the respective threaded nut at least indirectly coupled to the at least one parking robot wheel, and the respective drive installation, by correspondingly rotating the threaded nut about the respective central threaded bar, by way of the respective central threaded bars to adjust the holding device relative to the respective threaded nut between the lowered and the raised position.

3. The parking robot of claim 1, wherein each of the at least one drive installations, by driving the at least one parking robot wheel on a circular path about the central threaded bar, rotates the threaded nut about the central threaded bar.

4. The parking robot of claim 1, wherein each of the at least one drive installations has a collector ring, and the at least one drive machine, while driving the at least one parking robot wheel on the circular path, is likewise moved about the central threaded bar and, by the collector ring, is provided with electric power.

5. The parking robot of claim 1, wherein each of the at least one drive installations has two parking robot wheels and, for adjusting the holding device between the lowered and the raised position, drives both of the parking robot wheels in a respective opposite rotation direction of the parking robot wheels and, for a translatory movement of the parking robot, drives the two parking robot wheels in the same rotation direction.

6. The parking robot of claim 1, wherein each of the least one parking robot wheels, by way of a respective bearing axle, is at least indirectly coupled elastically to the respective threaded nut, wherein the respective bearing axle is coupled to a respective absorption unit of the drive installation.

7. The parking robot of claim 1, wherein the threaded bar at the respective other end is coupled to a respective detent element which blocks the rotation of the respective threaded nut about the respective central threaded bar at the respective other end of the respective threaded bar when the respective other end is reached.

8. The parking robot of claim 1, wherein each of the at least one parking robot wheels has a respective drive shaft which is coupled to a respective output shaft of the respective drive machine by way of a respective belt drive.

9. The parking robot of claim 1, wherein the parking robot moves below the transportation vehicle and autonomously positions itself in the receiving position on the wheel of the transportation vehicle.

10. The parking robot of claim 1, wherein the holding device on each of the two opposite sides has a wheel holding arm for firmly holding the wheel of the transportation vehicle and a connection element holding the wheel holding arms in a parallel position, wherein the respective wheel holding arm has a respective slip roller, the respective rotation axis of the slip roller being disposed parallel with a longitudinal direction of the respective wheel holding arm.

11. A method of moving a transportation vehicle using a parking robot, the method comprising:
holding a wheel of the transportation vehicle by a holding device of the parking robot;
driving at least one parking robot wheel of the parking robot using at least one drive installation, wherein the at least one drive installation is disposed at least indirectly on two opposite sides of the holding device, wherein the at least one drive installation has one height-adjustable running gear having the at least one parking robot wheel and at least one drive machine for driving the at least one parking robot wheel;
adjusting, by the running gear, the holding device relative to the at least one parking robot wheel between a lowered position and a raised position by rotation of a central threaded bar relative to a respective threaded nut, wherein one of the central threaded bar and the threaded nut is at least indirectly coupled with the holding device and the other of the central threaded bar and the threaded nut is at least indirectly coupled with the at least one parking robot wheel of a respective one of the at least one drive installations; and
autonomously moving, by the parking robot, the wheel of the transportation vehicle to a receiving position in which the holding device firmly holds the wheel and adjusts the holding device to the raised position, wherein the running gear is configured to raise the firmly held wheel of the transportation vehicle relative to the respective parking robot wheels.

12. The method of claim 11, wherein each of the at least one drive installations has one central threaded bar which is at least indirectly coupled rigidly to the holding device at one end, and the running gear of the respective drive installation has one threaded nut which is mounted rotatably about the respective central threaded bar and is at least indirectly coupled to the at least one parking robot wheel, and the respective drive installation, by correspondingly rotating the threaded nut about the respective central threaded bar, by way of the respective central threaded bars adjusts the holding device relative to the respective threaded nut between the lowered and the raised position.

13. The method of claim 11, wherein each of the at least one drive installations, by driving the at least one parking robot wheel on a circular path about the central threaded bar, rotates the threaded nut about the central threaded bar.

14. The method of claim 13, wherein each of the at least one drive installations has a collector ring, and the at least one drive machine, while driving the at least one parking robot wheel on the circular path, is likewise moved about the central threaded bar and, by the collector ring, is provided with electric power.

15. The method of claim 11, wherein each of the at least one drive installations has two parking robot wheels and, for adjusting the holding device between the lowered and the raised position, drives both of the parking robot wheels in a respective opposite rotation direction of the parking robot wheels and, for a translatory movement of the parking robot, drives the two parking robot wheels in the same rotation direction.

16. The method of claim 12, wherein each of the least one parking robot wheels, by way of a respective bearing axle, is at least indirectly coupled elastically to the respective threaded nut, wherein the respective bearing axle is coupled to a respective absorption unit of the drive installation.

17. The method of claim 12, wherein the threaded bar at the respective other end is coupled to a respective detent element which blocks the rotation of the respective threaded nut about the respective central threaded bar at the respective other end of the respective threaded bar when the respective other end is reached.

18. The method of claim 11, wherein each of the at least one parking robot wheels has a respective drive shaft which is coupled to a respective output shaft of the respective drive machine by way of a respective belt drive.

19. The method of claim 11, wherein the parking robot moves below the transportation vehicle and autonomously positions itself in the receiving position on the wheel of the transportation vehicle.

20. The method of claim 11, wherein the holding device each of the two opposite sides has a wheel holding arm for firmly holding the wheel of the transportation vehicle and a connection element holding the wheel holding arms in a parallel position, wherein the respective wheel holding arm has a respective slip roller, the respective rotation axis of the slip roller being disposed parallel with a longitudinal direction of the respective wheel holding arm.

\* \* \* \* \*